UNITED STATES PATENT OFFICE.

ALBERT WOLFF, OF BERLIN, GERMANY.

METHOD OF STERILIZING AIR.

1,423,704.  Specification of Letters Patent.  Patented July 25, 1922.

No Drawing.   Application filed November 3, 1920.   Serial No. 421,589.

*To all whom it may concern:*

Be it known that I, ALBERT WOLFF, a citizen of the German Empire, residing at Berlin, Germany, have invented certain new and useful Improvements in Methods of Sterilizing Air (for which I have filed applications in Germany Sept. 12, 1917, Patent No. 316,516; Germany Aug. 14, 1916; Germany Jan. 24, 1917), of which the following is a specification.

My invention refers to methods for sterilizing air, and more especially to a method for the continuous production of air which is pure and free from germs, by the employment of a solution of ozone.

The methods and apparatus hitherto known for the purification and improvement of air by means of ozone, or of ozone and water, all supply air which is ozoniferous in a more or less considerable measure, owing to ozone being soluble in pure or city water only in very minute quantities and very quickly escaping from the water again, if a solution is formed at all. Every treatment of air with water and with the quantities of ozone needed for achieving a sterilization of the air worth mentioning, therefore results in the production of air which is ozoniferous in such a degree that it is unsuited for therapeutic purposes, and more especially for the treatment of open wounds as well as of the respiratory organs. For such cases it is necessary to employ absolutely pure, i. e., sterile air which, besides, is free from all disinfectants and therefore perfectly odourless.

Moreover, it has already been proposed to purify and degerminate air by conducting it through very finely distributed germicidal solutions on the counter-flow principle. These processes, however, possess the disadvantage of the aforesaid solutions being waste after using them and of therefore having to be thrown away after use; consequently they are expensive in use and unhandy as regards employment as they necessitate constant renewing of the disinfectant.

In the process forming the object of my invention, the drawbacks described above, are avoided.

According to my invention air is sterilized and supplied in a pure state free from disinfectants, and therefore without odour, by washing it on the counterflow principle and in the finest possible state of distribution with a stable ozonic solution containing a large percentage of ozone and especially prepared for the purpose such solutions being obtained for instance, by subjecting water treated with suitable admixtures, to an ozonifying process as described in the specification of German Patent Nr. 297335 and which substantially consists in adding to a solution of at least 3 per cent pure hydrogen peroxide about 0.7 to 0.8 per cent salt, saturating the solution so prepared with oxygen at a temperature of about 0 to 2 degr. C. and then saturating it with ozone, preferably by spraying it in a receptacle filled with ozone under pressure. As compared with the treating of air with ozone or with ozone in combination with pure or city water respectively, the employment of a special ozonic solution of this kind for the washing liquid has the advantage of producing a very extensive sterilization owing to the strong germicidal effect of such an ozonic solution, whilst, on the other hand, air is produced which is practically free from ozone, this latter effect being due to the fact that in a solution of the kind described the ozone is combined so firmly that it does not escape from it. Finally, such a solution of ozone need not be thrown away after use, as it can be made fit for use again by adding fresh ozone. Consequently the new process can be developed as a cyclic process in which a continuous stream of pure air free from germs and ozone, is produced with the same quantity of liquid.

To this end the impure air is conducted in a cycle in such a manner that it rises upwards (for instance, in an irrigation tower with a corresponding filling) against a stable ozonic solution containing a high admixture of ozone and which flows downwards in a shower on the counter-flow principle, the air thus coming into most intimate contact with the ozoniferous water and being most thoroughly freed from mechanical admixtures and germs, so that it leaves the apparatus pure and free from germs and without smelling of ozone and is ready for immediate use for therapeutic purposes. The ozonic solution employed is then restored and purified in a second cycle, for instance, in a sprinkling tower, by adding ozone, after which the solution returns into the first cycle where it exerts its purifying effect afresh. This process therefore permanently works with one and the same quantity of liquid and is therefore in no way dependent on the presence of a water supply or discharge, being for this reason applicable everywhere by means of portable devices or apparatus on wheels.

In the drawings affixed to this specification and forming part thereof a combination of devices adapted for carrying out the novel method is illustrated diagrammatically by way of example.

Referring to the drawings, 1 is a compressor and 2 is the electromotor driving it. The smaller part of the air is forced by the compressor through valve 3 into an ozone generator 4 of some suitable kind and after having been ozonized therein passes into the saturation tower or scrubber 5. An air current rises through this tower from below while water to which suitable additions have been made, flows down over the filling, taking up ozone from the air and collecting at the foot of the tower. The ozonized water is then sucked through the pipe 6 by the pump 7 into the pipe 8 and forced into the tower or scrubber 9 in order to be washed there. The ozone solution trickling down in the tower encounters the main part of the air forced by the compressor 1 through valve 10 and pipe 11 into the lower part of tower 9. By the intimate contact with the ozone solution the air is thoroughly washed and sterilized. It leaves the upper part of tower 9 through the pipe 12 and is then led to the place where it shall be utilized. The ozone solution in trickling down the tower 9 and sterilizing the air has lost the greater part of the ozone contained therein. It collects at the foot of the tower and is forced back by a pump 14 through pipes 13 and 15 onto the saturation tower 5 to be saturated anew with ozone whereupon it returns through pipes 6 and 8 and pump 7 to the washing tower 9. The pumps 7 and 14 are coupled with a common driving motor 16.

I claim:

The method of sterilizing air which consists in washing air on the counter-flow principle and in the finest possible state of distribution with a stable watery solution rich in ozone, renewing the percentage of ozone in the said washing liquid after use and using it anew for washing air.

In testimony whereof I affix my signature.

ALBERT WOLFF.